(12) United States Patent
Bae

(10) Patent No.: US 6,494,842 B2
(45) Date of Patent: Dec. 17, 2002

(54) ULTRASOUND RECEIVE BEAMFORMING APPARATUS USING MULTI STAGE DELAY DEVICES

(75) Inventor: Moo-Ho Bae, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 45 days.

(21) Appl. No.: 09/821,179

(22) Filed: Mar. 28, 2001

(65) Prior Publication Data

US 2001/0051772 A1 Dec. 13, 2001

(30) Foreign Application Priority Data

Jun. 10, 2000 (KR) .......................................... 00-31894

(51) Int. Cl.⁷ ................................................ A61B 8/00
(52) U.S. Cl. ..................................................... 600/447
(58) Field of Search ........................ 600/437, 440–447, 600/459; 73/625, 626; 367/7, 11, 103, 130–138; 128/916

(56) References Cited

U.S. PATENT DOCUMENTS

| | | | | |
|---|---|---|---|---|
| 5,457,996 A | * | 10/1995 | Kondo et al. | 73/625 |
| 5,522,391 A | * | 6/1996 | Beaudin et al. | 600/443 |
| 5,555,534 A | * | 9/1996 | Maslak et al. | 367/135 |
| 5,600,675 A | * | 2/1997 | Engeler | 367/7 |
| 5,617,862 A | * | 4/1997 | Cole et al. | 600/459 |
| 5,685,308 A | * | 11/1997 | Wright et al. | 600/443 |
| 5,840,032 A | * | 11/1998 | Hatfield et al. | 128/916 |
| 5,882,307 A | * | 3/1999 | Wright et al. | 600/442 |
| 5,905,692 A | * | 5/1999 | Dolazza et al. | 367/103 |
| 6,102,863 A | * | 8/2000 | Pflugrath et al. | 600/447 |
| 6,111,816 A | * | 8/2000 | Chiang et al. | 367/138 |

* cited by examiner

Primary Examiner—Marvin M. Lateef
Assistant Examiner—Ali M. Imam
(74) Attorney, Agent, or Firm—Thelen Reid & Priest LLP; David B. Ritchie

(57) ABSTRACT

By using a novel structure of a beamformer which produce data for multiple receive scanlines in a time multiplexed manner, the size of the delay memory is reduced. An ultrasound receive beamforming apparatus for processing signals received from an array of transducers, comprises: a plurality of beamforming devices for applying delays to data samples of M channels. Each of said beamforming devices includes: a predetermined number of per-channel delay elements which provide first delays to the data samples of M channels, to provide delayed data per each channel and per each receive beam, first adders for adding the delayed data of not less than 2 channels provided from the per-channel delay elements, and multi-channel delay elements which provide second delays to the outputs of the first adders.

6 Claims, 4 Drawing Sheets

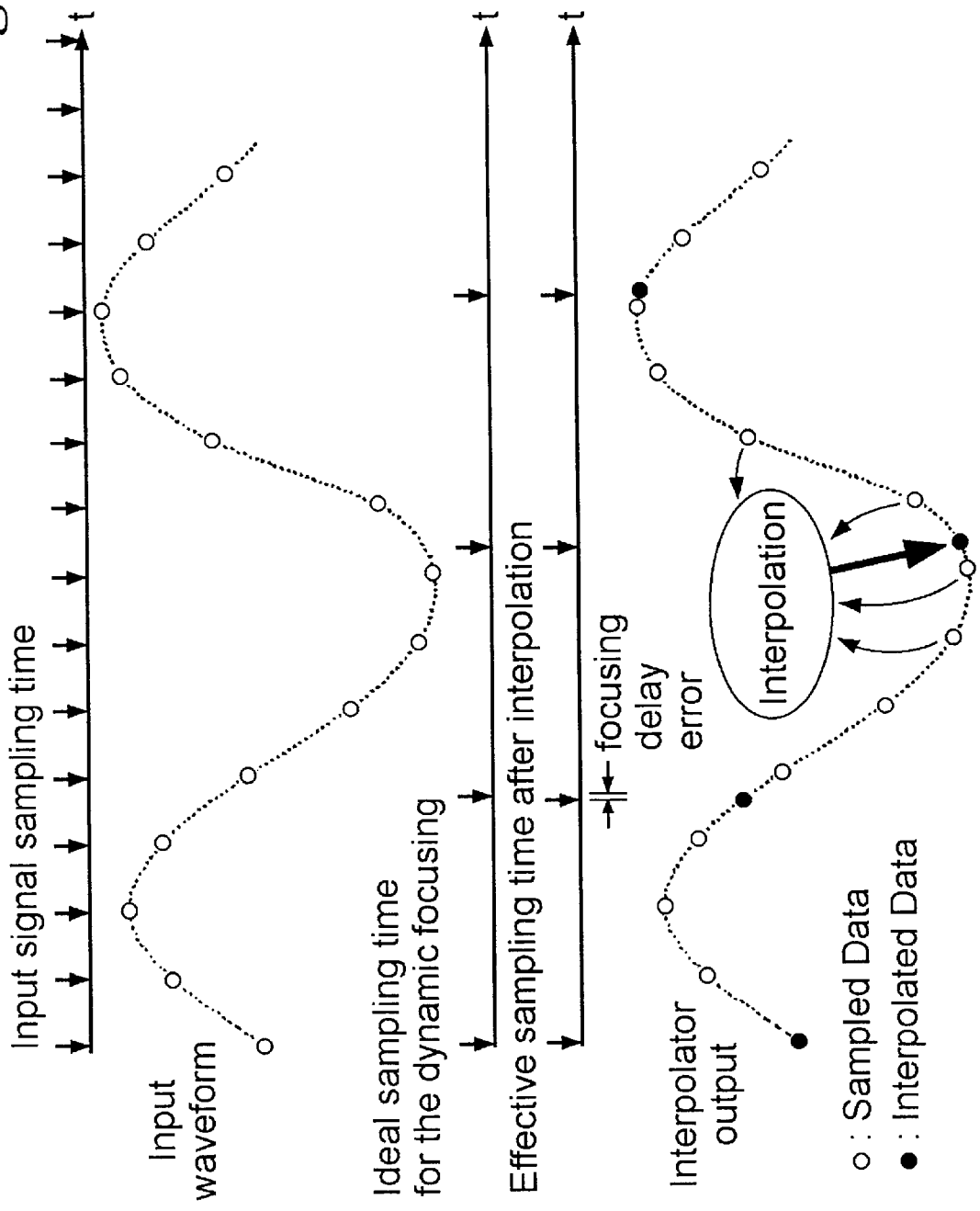

ULTRASOUND RECEIVE BEAMFORMING APPARATUS USING MULTI STAGE DELAY DEVICES

BACKGROUND OF THE INVENTION

Field of the Invention

The present invention relates to an ultrasound imaging apparatus using a digital beam focusing scheme. More particularly, the present invention relates to a receive beamforming apparatus for processing a plurality of scan lines or beams. It includes delay elements structured into multiple stages.

Description of the Related Art

As well known in the art, an ultrasound imaging system using an array of transducers includes a phased, convex or linear array of multiple transducers. Such a system includes multiple channels, each channel having a transmitter and a receiver connected to a corresponding transducer. The transmitter applies ultrasound pulses to an object such as one in a human body. To focus the transmitted ultrasound energy to a certain point in the object, sequential time delays are applied to the pulses. The amount of delay for each pulse is determined in a way that the transmitted pulses reach a target point simultaneously. These pulses pass through diverse materials/medium before focused on the object and the reflected pulses pass through the materials again, back to the array.

The ultrasound energy reflected from the object reaches each of the array elements at different times because the distances from the object to the array elements are different from each other. At a receive beamformer, the receive signals from the array elements are amplified; a time delay is applied to each of the amplified signals; and the delayed signals are summed. The amount of delay for each delay element is determined such that the signals are focused at a point in a receive scan line or beam. The amount of delay for each element is changed constantly so that the focusing point moves in a radial direction.

To form an ultrasound image, a desired region in a body should be scanned with transmitted pulses, and a received signal/data is processed to provide the image of the desired region. To provide a high quality image, it is essential to increase the frame rate. The frame rate is determined by the number of scanlines used, the frequency of ultrasound pulses and the depth of a region whose image is to be formed. To increase the frame rate, a multi-beam focusing technique has been used where multiple scanlines or beams, rather than one scan line, are formed after transmitting ultrasound pulses.

In a multi-beam-forming apparatus, a different amount of delay should be applied for each beam and per channel, thus increasing the complexity of a system. Especially, the capacity of a memory device used as the delay elements is increased. In a conventional beamformer, the capacity of a needed memory device is proportional to the number of channels, the maximum amount of delay and the number of beams formed after one transmission. For example, for a system with 64 channels, quadruple beams, a maximum delay of 1000 system clock cycles, and 10 bit data length, 64×4×1000×10 bits of memory space is necessary.

SUMMARY OF THE INVENTION

Therefore, it is an objective of the present invention to provide a novel structure of a beamformer which can decreases the size of the delay memory.

It is another objective of the present invention to provide a beamformer which produce data for multiple receive scanlines in a time multiplexed manner.

In accordance with one aspect of the present invention, there is provided an ultrasound receive beamforming apparatus for processing signals received from an array of transducers, comprising: a plurality of beamforming devices, each device applying delays to data samples of M channels provided from M transducers for forming N receive beams and adding delayed data samples of M channels to provide N intermediate outputs, N and M being positive integers less than the number of transducers in the array; adders for summing the intermediate outputs from said plurality of beamforming devices, to provide data representing the N receive beams, wherein each of said beamforming devices includes: a predetermined number of per-channel delay elements which provide first delays to the data samples of M channels, to provide delayed data per each channel and per each receive beam, first adders for adding the delayed data of not less than 2 channels provided from the per-channel delay elements, and multi-channel delay elements which provide second delays to the outputs of the first adders.

BRIEF DESCRIPTIONS OF THE DRAWINGS

The above and other objects and features of the present invention will become apparent from the following description of preferred embodiments given in conjunction with the accompanying drawings, in which:

FIG. 4 explains the function of the decimation filter.

DETAILED DESCRIPTION OF THE PRESENT INVENTION

Figure 1:
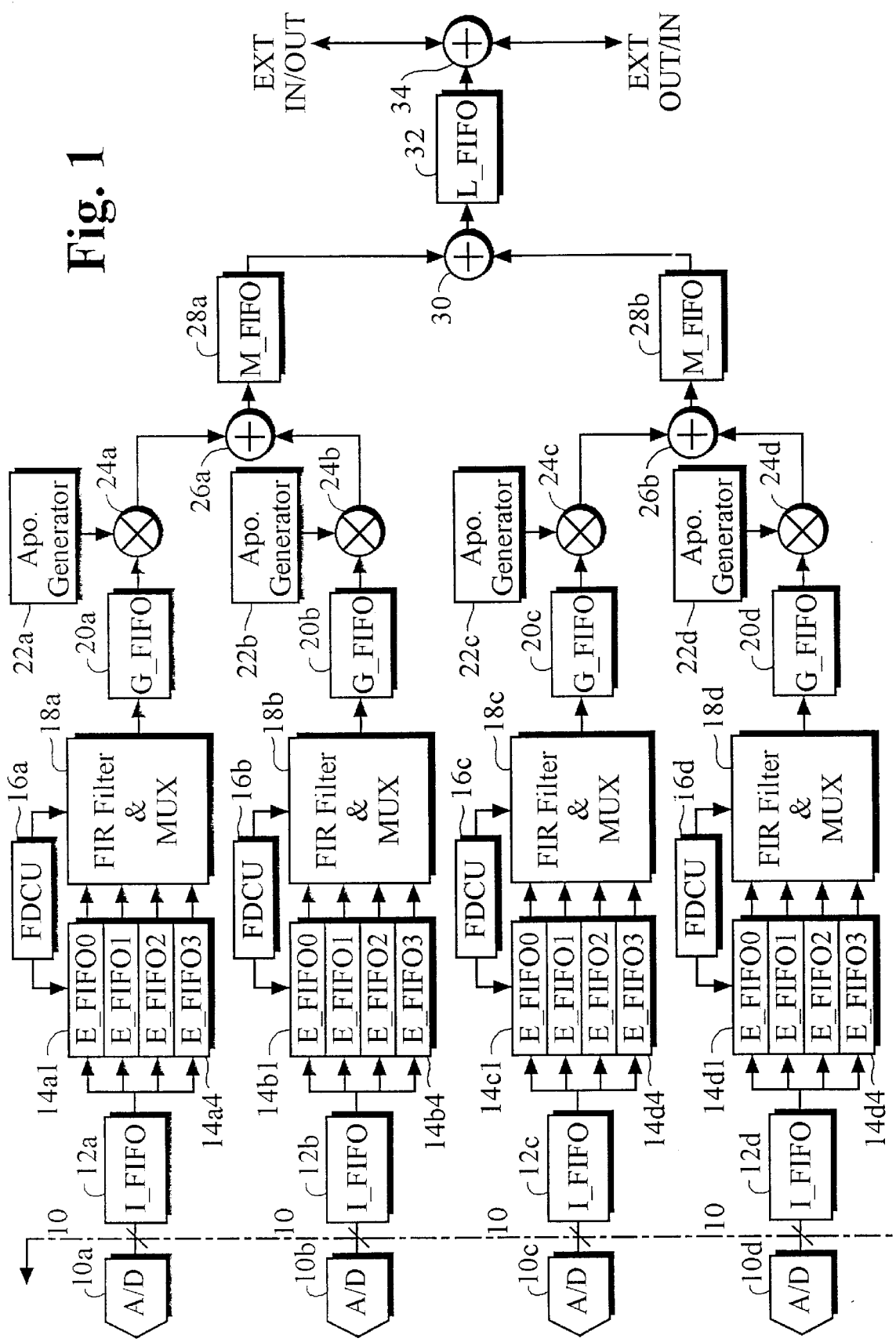
FIG. 1 shows a block diagram of the beamforming apparatus of the present invention.

FIG. 1 shows a digital four-channel beamforming apparatus that can simultaneously process data samples received from four elements of an ultrasonic transducer array in accordance with one embodiment of the present invention. The beamforming apparatus shown in FIG. 1 applies coarse time delays in four distinct stages to each channel of data samples; filters and time-multiplexes each channel of time-delayed data; multiplies each channel of filtered, time-multiplexed data by an apodization factor derived from a predetermined apodization curve; and sums the data thereby obtained, to provide intermediate outputs. The intermediate outputs from the multiple beamforming apparatus are summed to provide time-multiplexed final outputs representing up to 4 focused beams, where each time interval of the time-multiplexed output data relates to a distinct receive beam. In an ultrasound imaging device where data from 64 channels are combined in a beamforming process to provide one receive scanline or beam, 16 such beamforming apparatus as shown in FIG. 1 are needed.

Although the beamforming apparatus can simultaneously provide intermediate outputs for forming up to 4 receive beams, the number of beams formed at one time can be varied depending on, for example, the center frequency of the ultrasound signal.

The time delays introduced by the beamforming apparatus include a coarse delay and a fine delay. The coarse delay, which is a delay amounting to an integer multiple of a system clock cycle, is implemented in four distinct stages by first-in, first-out (FIFO) registers, E_FIFOs, G_FIFOs, M_FIFOs and L_FIFOs shown in FIG. 1. Each register or delay element delays data by controlling the time at which the read-in data is outputted. The fine delay, a fraction of a system clock cycle, is introduced for each channel by a combination of finite impulse response (FIR) filter and multiplexer (MUX) 18a–18d shown in FIG. 1. Apodization is implemented for each channel by a multiplier 24a–24d and an apodization generator 22 to adjust amplitude of data samples. The summation is implemented in three distinct stages by four adders 26a, 26b, 30, 34.

Referring to FIG. 1, data from each transducer element (not shown) or each channel is fed to an A/D converter 10a–10d where it is sampled. The sampled data is provided to a respective one of input buffers 12a–12d. The output data from each input buffer is subject to delays in various stages. That is, coarse delays are introduced sequentially by FIFOs 14,20,28,32, and fine delay is introduced by an FIR filter and multiplexer 18.

For each channel, four E_FIFOs 14a1–14a4 are connected in parallel to the input buffer 12a. The sampled data of a channel is written at the same time to all four E_FIFOs of that channel. The 4 E_FIFOs in a channel introduce delays corresponding to 4 receive beams, respectively, and generate respective outputs at different times. Output data from the four E_FIFOs are time-multiplexed by a multiplexer (shown in FIG. 3) and filtered by a finite impulse response (FIR) filter so that fine delays are introduced to the sampled data. The time-multiplexing and filtering will be explained in more detail referring to FIGS. 3 and 4.

The filtered and time-multiplexed data of each channel are written to a G_FIFO 20a–20d, which introduces the second stage of coarse delay. For each channel, data output from the G_FIFO is subjected to apodization, performed by a multiplier 24a–24d and an apodization generator 22. The multipliers 24a–24d multiplies the filtered, time-multiplexed data output from the G_FIFOs by an apodization factor derived from a predetermined apodization curve at the apodization generator 22. The apodization curve may be stored in a memory (not shown) and provided to the apodization generators 22.

Apodized data from each pair of adjacent channels are summed by adders 26a, 26b respectively and the resultant summed data are written to corresponding M_FIFOs 28a, 28b, which introduce the third stage of coarse delay. Data output from the M_FIFOs 28a, 28b are summed by adder 30 and the sum is written to L_FIFO 32, which introduces the fourth stage of coarse delay.

The reason for implementing the coarse delay in four stages is as follows. The difference in delays applied to data samples from multiple channels to form multiple beams depends on the distance between the channels and/or beams. In other words, the difference in delays between two adjacent channels or beams is smaller than that between two non-adjacent channels. The first stage coarse delay elements (E_FIFOs) accordingly cover the maximum delay difference between as many as four beams for a given channel. The second stage coarse delay elements (G_FIFOs) cover the maximum delay difference between two adjacent channels that are not covered by the first stage elements. The third stage coarse delay elements (M_FIFOs) cover delay differences among four neighboring channels which are not covered by the first and the second-stage elements. The fourth stage coarse delay element covers delay difference with channels that are processed in other beamforming apparatus.

As the delayed samples from two channels are summed before subjected to the third stage delay M_FIFOs, only two delay components M_FIFO are necessary in the third stage. Similarly, since delayed samples from four channels are added in the adder 30 before being subjected to the fourth stage delay, only one L_is used in the fourth stage. Therefore, by distributing the delay components and the adders in a hierarchical manner as shown in FIG. 1, the amount of memory required to introduce focusing delays is reduced.

In one embodiment of the present invention, the maximum time-delays applied by the E_, G_FIFO, M_, and L_registers are 64, 256, 256, and 1024 clock cycles, respectively. That is, the time delay given by L_is usually much greater than delays by other FIFOs so as to save the memory space as much as possible.

The summation is also implemented in three distinct stages. The first-stage adders 26a and 26b sum delayed sampled data from the upper two channels (channel 0 and 1) and from the lower two channels (channel 2 and 3), respectively. The second-stage adder 30 sums delayed outputs of the adders 26a and 26b. The third-stage adder 34 sums intermediate outputs from multiple beamforming apparatus like the one in FIG. 1, to provide a final result representing as many as four receive beams.

Figure 2:
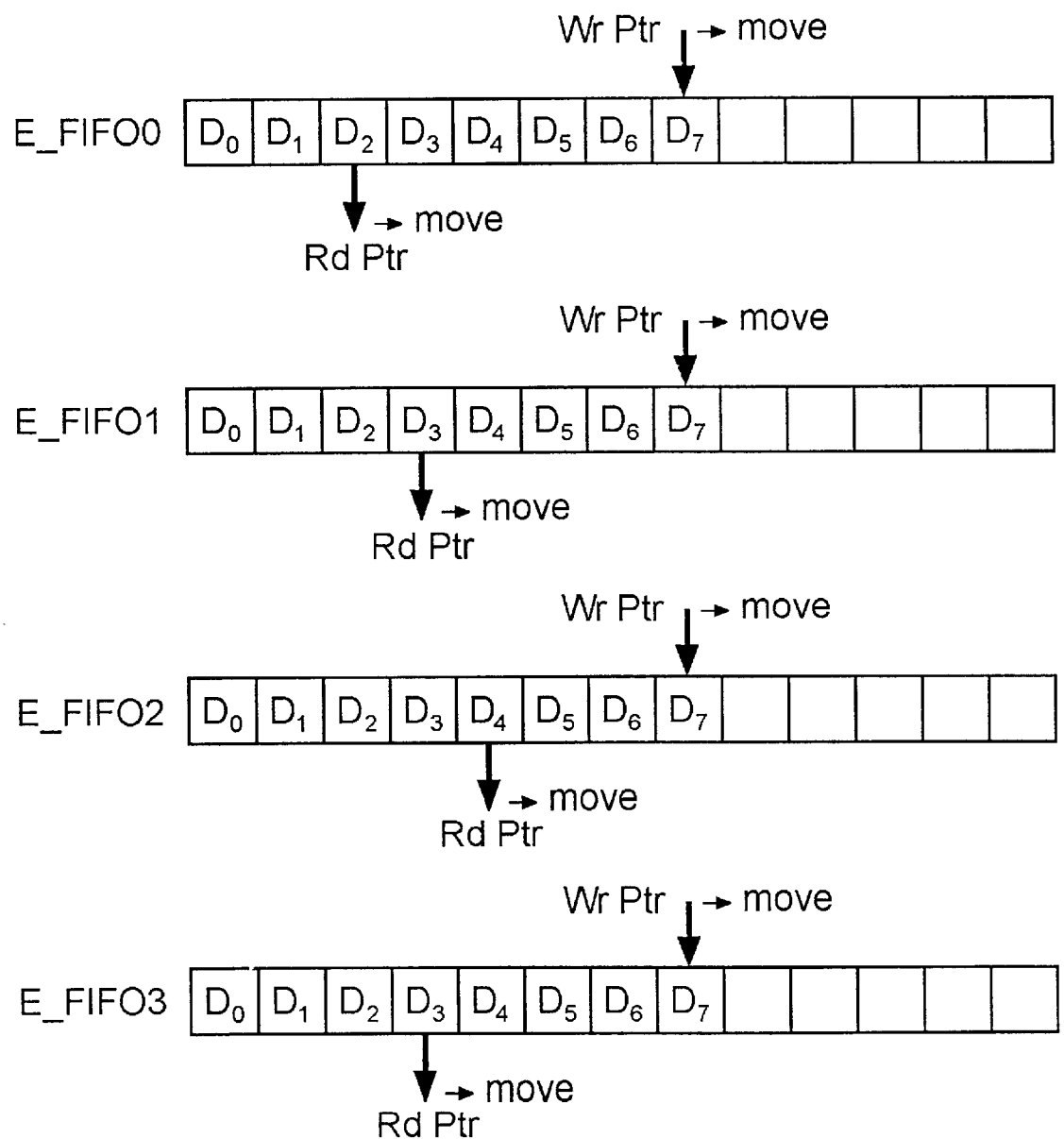
FIG. 2 illustrates the operation of E_FIFO.

FIG. 2 illustrates the operation of E_in accordance with one embodiment of the present invention. In FIG. 2, data provided from each channel is denoted as $D_i$ and is written to each E_one by one. As shown in FIG. 2, write pointers (Wr_Ptr), which denote a bit position where a data is to be written, are located at a same position for all 4 E_FIFOs and move to the next bit every time a data is written. Thus, data from four channels are written at the same time. However, the time at which $D_i$ stored in each E_is read out and fed to registers in the filter and MUX block is different for each beam (or for each E_.) As shown in FIG. 2, read pointers (Rd_Ptr) may point to different bit positions.

In FIG. 2, data written in E_FIFO0 is read out 5 clock cycles after it was written while data written in E_FIFO1 is read out 3 clock cycles after it was written, thereby introducing different amounts of delays to two beams. The amount of delay applied per each beam per each channel is controlled by difference of read and write pointer locations. The locations of pointers are determined in FDCU 16 shown in FIG. 1. Specifically, it is determined whether to move the read pointers by one memory location per clock cycle or not, based on a delay curve.

Figure 3:
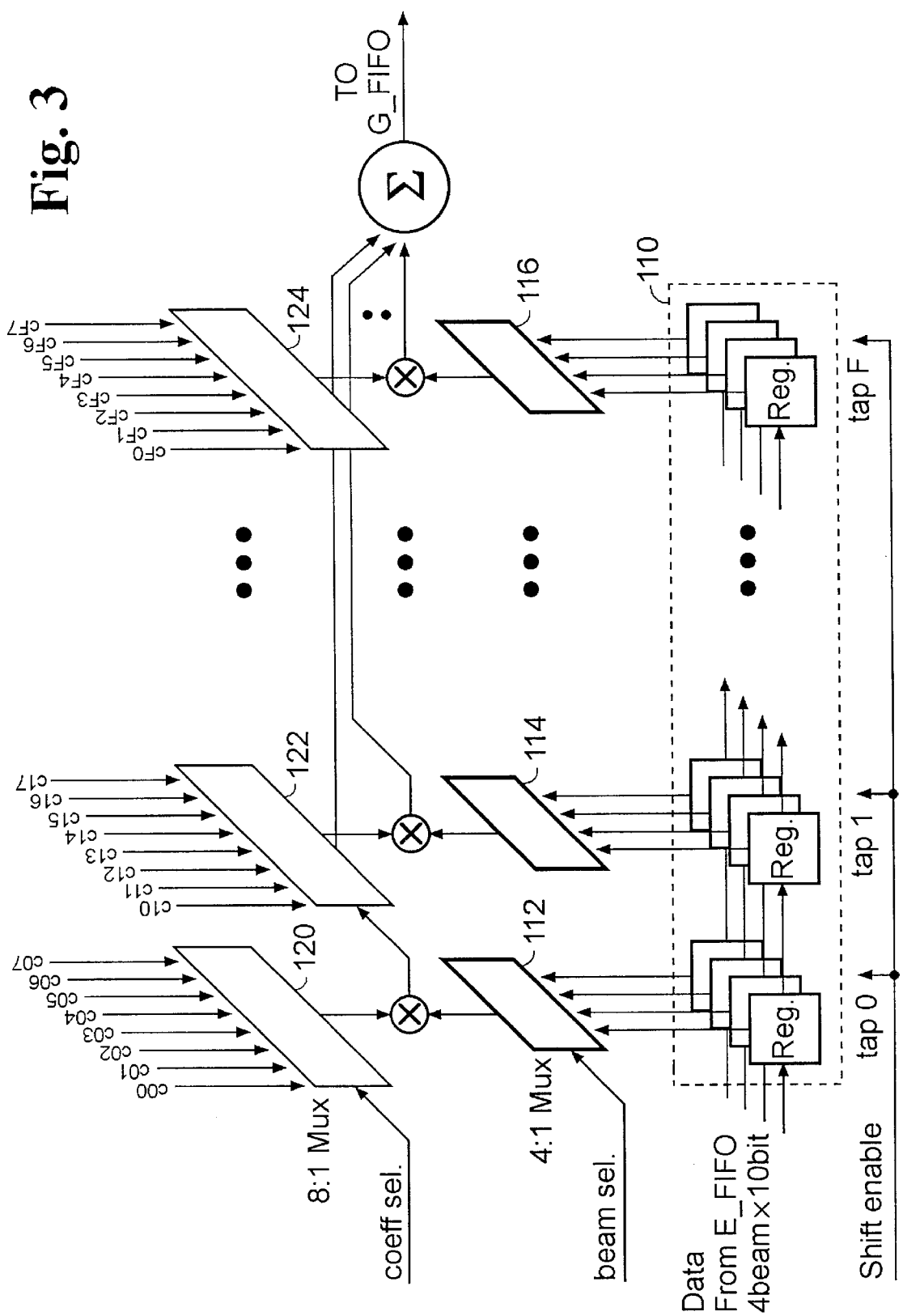
FIG. 3 is a detailed diagram of the filtering and multiplex block shown in FIG. 1.

FIG. 3 is a detailed diagram of the filtering and multiplex block 18 shown in FIG. 1. As shown in FIG. 3, a shift register block 110 includes four sets of 16 tap registers. Each set of registers store 16 consecutive data read from a corresponding E_FIFO. In one embodiment of the invention, each data from E_FIFO includes 10 bits and thus each register can store as many as 10 bits.

These 16 consecutive data are filtered by a 16-tap filter denoted by Cij. The coefficients of each filter are selected from among a set of eight predetermined coefficients (Ci0 to Ci7) by using 8:1 multiplexers 120, 122 and 124. In one embodiment of the present invention, the filter coefficients Cij may be predetermined at a separate filter coefficient bank (not shown) and provided to the filtering and multiplex block 18. A coefficient selection signal is provided to the 8:1 multiplexors 120–124 to control the multiplexors to select one among 8 sets of coefficients. The coefficient selection signals are determined based on the amount of a fine delay applied in the filtering and multiplex block 18.

The filtering of 16 consecutive data is done in a time-multiplexed manner by selecting a set of 16 tap registers among the four sets in the shift register block 110 with the help of the 4:1 MUX's. Beam selection signal is fed to each 4:1 multiplexor and represents which of four beams are processed. Then, the filter coefficients selected at the 8:1 multiplexors are multiplied to the 16 data selected at the 4:1 multiplexors 112, 114, 116. Filtering is performed on data provided from E_FIFO0, E_FIFO1, E_FIFO2, and E_FIFO3 in that order, then again on data provided from E_FIFO0, and so forth.

While data from E_FIFOs are fed into the 16 tap registers, shift enable signals shown in FIG. 3 are used to determine whether data is shifted in the registers or not at a particular clock cycle. At the clock cycle when read pointer shown in FIG. 2 moves, the shift enable signal controls the registers so that data are shifted through the registers. When the read pointer stays to adjust the amount of delay, the shift enable signal is disabled so that data are not shifted in the registers. By synchronizing the movement of read pointers at E_FIFOs and that of data movement in the shift registers, duplicate writing of same data in the registers 110 are prevented. If a same data is written in the registers twice, an interpolated data may not be exact.

FIG. 4 explains the function of the FIR filter shown in FIG. 3. A fine delay is realized by using interpolation filters. By appropriately choosing FIR filter coefficients, a fine delay amounting to a fraction of system clock cycle can be applied to a delayed sample data. By applying a fine delay smaller than the system clock cycle, delay error can be reduced.

An input waveform shown in FIG. 4 represents data fed from the E_FIFO into the register set. The FIR filters shown in FIG. 3 are interpolation filters which determine midpoint values of the waveform between the sample data. In FIG. 4, the function of a 4-tap interpolation filter is depicted for simplicity.

In the present invention, multi-stage delay elements are used and in some stages, elements are commonly used by a number of channels so that the amount of memory needed to introduce the delay elements is reduced. Also, multiple beams are processed in a time-multiplexed manner so that the overall hardware complexity is lowered.

While the present invention has been described and illustrated with respect to the particular embodiment, it will be apparent to those skilled in the art that variations and modifications are possible without deviating from the broad principles and teachings of the present invention which should be limited solely by the spirit and scope of the claims appended hereto.

What is claimed is:

1. An ultrasound receive beamforming apparatus for processing signals received from an array of transducers, comprising:

a plurality of beamforming devices, each device applying delays to data samples of M channels provided from M transducers for forming N receive beams and adding delayed data samples of M channels to provide N intermediate outputs, N and M being positive integers less than the number of transducers in the array;

means for summing the intermediate outputs from said plurality of beamforming devices, to provide data representing the N receive beams, wherein each of said beamforming devices includes:

a predetermined number of per-channel delay elements which provide first delays to the data samples of M channels, to provide delayed data per each channel and per each receive beam, first adders for adding the delayed data of not less than 2 channels provided from the per-channel delay elements, and multi-channel delay elements which provide second delays to the outputs of the first adders.

2. The ultrasound receive beamforming apparatus of claim 1, wherein each of said beamforming devices provides N intermediate outputs for N receive beams in a time-multiplexed manner, each intermediate output being a sum of delayed data samples of M channels, and said summing means provides data representing the N receive beams in a time-multiplexed manner.

3. The ultrasound receive beamforming apparatus of claim 1, wherein said per-channel delay elements includes:

coarse delay elements for providing delay of integer multiples of a system clock cycle; and fine delay elements for providing delay smaller than a system clock cycle.

4. The ultrasound receive beamforming apparatus of claim 3, wherein the fine delay elements include interpolation filters, and each interpolation filter uses a set of data samples from a channel to determine interpolated data between data samples.

5. The ultrasound receive beamforming apparatus of claim 3, wherein the fine delay element includes:

M sets of shift registers, each set including L shift registers for storing L consecutive data samples from each channel;

M:1 multiplexor which selects one among said M sets and provides the L data samples stored in the selected set;

selection means for selecting one set among a number of sets of predetermined filter coefficients depending upon the amount of delay applied in the fine delay element, each set of including L filter coefficients; means for multiplying said L data samples from M:1 multiplexor by the L filter coefficients provided from the selection means and summing the L multiplication results.

6. The ultrasound receive beamforming apparatus of claim 3, wherein said coarse delay elements includes N FIFOs per each channel, each FIFO storing data samples to be used to form each beam, data stored at each FIFO is read at the time determined by the amount of coarse delay, means for controlling write pointers in the N FIFOs of each channel as the same, and means for controlling read pointers in the N FIFOs of each channel independently.

\* \* \* \* \*